United States Patent [19]

Audykowski et al.

[11] 4,004,054
[45] Jan. 18, 1977

[54] MIXTURE FOR THE MANUFACTURE OF ANTISTATIC FLOOR COVERINGS AND COATINGS

[75] Inventors: Thaddeus Audykowski; Kurt Amsler, both of Basel, Switzerland

[73] Assignee: Ciba-Geigy Corporation, Ardsley, N.Y.

[22] Filed: Apr. 11, 1975

[21] Appl. No.: 567,453

Related U.S. Application Data

[62] Division of Ser. No. 473,548, May 28, 1974, abandoned.

[30] Foreign Application Priority Data

June 15, 1973 Switzerland .................. 8724/73

[52] U.S. Cl. .................. 427/385 R; 252/51; 260/33.6 EP; 260/37 EP; 260/42.37; 260/DIG. 16; 427/386
[51] Int. Cl.² .......................................... B05D 3/02
[58] Field of Search ........... 252/51 L; 260/33.6 EP, 260/37 EP, 42.37, DIG. 16; 427/386, 385

[56] References Cited

UNITED STATES PATENTS

| 2,843,554 | 7/1958 | Murphy | 260/18 EP |
|---|---|---|---|
| 2,868,759 | 1/1959 | Becha | 260/42.22 |

FOREIGN PATENTS OR APPLICATIONS

| 801,826 | 9/1958 | United Kingdom |
|---|---|---|
| 955,218 | 4/1964 | United Kingdom |
| 1,132,313 | 10/1968 | United Kingdom |

OTHER PUBLICATIONS

Lee et al.—*Handbook of Epoxy Resins* (McGraw-Hill) (NY) (1967), pp. 2–3, 6–3, 14–7, 14–9, 14–33.

*Primary Examiner*—Michael R. Lusignan
*Attorney, Agent, or Firm*—Luther A. R. Hall

[57] ABSTRACT

A mixture containing a cold-curing liquid synthetic resin combination, an anti-sedimentation agent and aluminium grit is used for the manufacture of antistatic floor coverings or coatings, which are colorful or lightcolored and have a uniform electrical conductivity of good reproducibility.

14 Claims, No Drawings

MIXTURE FOR THE MANUFACTURE OF ANTISTATIC FLOOR COVERINGS AND COATINGS

This is a division of application Ser. No. 473,548 filed on May 28, 1974, now abandoned.

Since the introduction of liquid synthetic resins based on epoxide resins, polyurethanes or unsaturated polyesters, which cure through a polyaddition or polymerisation reaction with suitable curing agents and catalysts at room temperature, these plastics have found increased use, inter alia, in the fields of corrosion protection, in the form of chemically resistant coatings and of jointless hard-wearing floor coverings. In particular the liquid, solvent-free, aromatic epoxide resins, in combination with specially formulated liquid curing agents, for example based on polyamine adducts or polyaminoamide resins, have attained great and ever-increasing importance in practice due to the excellent mechanical properties of the cured coated materials, such as compressive strength, flexural strength, adhesion to various substrates, impact strength, abrasion resistance and chemical resistance, in the fields of use mentioned.

To prevent such coverings acquiring an electrostatic charge, electrically conducting, so-called antistatic, coverings, especially for floors, have been developed in recent years. Such special coverings are considered, above all, for areas where there is a severe explosion hazard, such as, for example, in operating theatres of hospitals, in paint shops, in large garages and in the manufacturing areas of chemical concerns. At the present time, special carbon blacks and graphite are predominantly used as the fillers for achieving the requisite electrical conductivity of such coverings. These floors are not popular, because of the black or dark grey surfaces, and in many cases do not meet the aesthetic requirements of the personnel working in the areas concerned. This limitation on the possible selection of colour shade also prevents the broader use of antistatic floor coverings.

It is also known to manufacture antistatic floor coverings using metal particles, such as aluminium flakes or copper filings. Here, the disadvantage is the non-uniform electrical conductivity, which turns out different from case to case. Admittedly, a process is known, from German Auslegeschrift No. 1,544,968, according to which this disadvantage is avoided; however, in return it is necessary to accept the fact that prior to the application of the plastic layer containing metal an undercoat of good conductivity, for example containing graphite, must be applied. This undercoat must then be cured and dried before the plastic covering can be applied.

It has now been found that using the mixture according to the invention, antistatic floor coverings and coatings can be manufactured which, on the one hand, are colourful or light-coloured, for example coloured in pastel shades and on the other hand have a uniform electrical conductivity of good reproducibility, and at the same time the application of one or more conducting undercoats is no longer required.

The mixture according to the invention is characterised in that it contains a cold-curing liquid synthetic resin combination, an anti-sedimentation agent and 45–70 percent by weight, based on the mixture, of aluminium grit and, optionally, fillers and/or, preferably, pigments. Preferably, the mixture contains 30–45%, especially 37–40%, of resin combination, 3–30%, especially 18–30%, of pigments and 45–65%, especially 50–60%, of aluminium grit. The particles of the aluminium grit are preferably 0.35–1.2 mm long.

Possible synthetic resin combinations are liquid epoxide resins, preferably based on aromatic compounds, or mixtures of resins based on aromatic compounds, such as bisphenol-A diglycidyl ether, with aliphatic epoxide resins, such as polyglycidyl ethers of polyalcohols, for example pentaerythritol, hexanetriol, butanediol or glycerol, in combination with liquid curing agents for these resins. As such curing agents there may be mentioned aliphatic or cycloaliphatic polyamines or their liquid adducts, containing at least one primary amino group, with polyepoxides, and also liquid polyaminoamide resins, that is to say reaction products of fatty acids and polyamines.

Further suitable synthetic resin combinations are those based on polyurethanes, such as, for example, a mixture of liquid polyester resins or polyether resins having a hydroxyl number of between 1.7 and 12% and liquid polyisocyanates, preferably based on diphenylmethane-4,4'-diisocyanate, as the curing agent.

Further suitable synthetic resin combinations are binders based on liquid unsaturated polyester resins, unsaturated monomeric compounds which react therewith, such as, for example, styrene, vinyltoluene or acrylic acid esters, and a peroxide catalyst.

Finally, there may also be mentioned synthetic resin combinations based on acrylate resin, unsaturated monomers reacting therewith, and a peroxide catalyst.

In order to achieve a uniformly distributed conductivity over the entire surface of the coating, the mixture according to the invention contains an anti-sedimentation agent, which prevents sedimentation of the aluminium grit particles away from the surface of the floor covering, which is liquid during application. Without this, after curing, the surface layer which has become enriched in binder would exhibit an excessive electrical resistance. As anti-sedimentation agents it is in principle possible to use thixotropic agents, such as, for example, silicon dioxide ("Aerosil") and montmorillonite ("Bentones"). The use of finely dispersed asbestos, such as, for example, "Sylodex" (of Messrs. Grace Co.), offers the advantage that it need not be dispersed separately but can be dispersed directly together with aluminium grit in the resin, using simple mixing machines, and exhibits a good anti-sedimentation action and good levelling properties.

The mixture according to the invention can be manufactured according to conventional methods. Preferably, various colour pastes, which consist of approx. 50% of pigment — it being possible to use all known inorganic and numerous organic pigments — and approx. 50% of resin, are manufactured by grinding on triple-roll mills or dispersing in Cowles dissolvers. These colour pastes are then introduced into a mixing vessel, after which the remainder of the resin is stirred in. Thereafter, the anit-sedimentation agent can be dispersed in the mixture and finally the aluminium grit, preferably of 99.5–99.7% purity and of 0.35–1.2 mm particle size, and, optionally, the additives required to achieve additional properties, such as levelling agents and de-aerating agents, can be stirred in. Separately from this basic mixture, which in commercial products is frequently also referred to as component I, the curing agent, or component II, is supplied in amounts corresponding to the mixing ratio required for optimum curing.

Before use, the two components are thoroughly mixed together, poured out onto the surface to be treated and spread uniformly, by means of a serrated trowel, to give a coating of the desired thickness, which can be between 3 and 5 mm. During this process, care must be taken that the aluminium grit is not distributed unevenly by the movement of the serrated trowel, because of the relatively large particle size of the grit. To achieve optimum levelling of the slightly thixotropic liquid mass, a subsequent treatment with a plastic spiked roller is carried out, which permits de-aeration and achieves bubble-free surfaces.

In order to achieve better de-aeration of the liquid mass during laying, and bubble-free surfaces of the coverings, it is possible to add 1–5%, preferably 1.5–2%, of paraffin oil or benzine (boiling range 100°–125° C) into the mixture which has been prepared for laying.

If, as is usually the case, the floor to be laid has a leakage resistance of $10^2$–$10^4$ ohm, it easily proves possible, using the mixture according to the invention, to manufacture coverings which exhibit the leakage resistance of less than $10^6$ ohm required by the DIN specification. In most cases, coverings with a leakage resistance of 103 ohm or less are obtained. If the bases to be covered have higher leakage resistances than $10^4$ ohm, it is necessary to provide earthed underlays in the form of metal foils or metal grids.

The coverings described in the examples which follow can readily be cared for by simple cleansing agents, show no conspicuous wear after months of exposure to chemicals, and to the customary traffic in manufacturing areas of chemical concerns, and retain their initial value of the leakage resistance.

EXAMPLES 1 – 6

In the examples which follow, the components mentioned are mixed with one another.

| | | |
|---|---|---|
| 1. | Epoxide resin based on the gylcidyl ether of 4,4'-dihydroxydiphenylmethane, diluted with 25% of cresyl glycidyl ether (viscosity at 25° C: 500–700 cP, epoxide equivalent weight 185–192) | 303 g |
| | Chrome oxide green | 20 g |
| | Titanium dioxide | 8 g |
| | Thixotropic agent based on asbestos (for example "Sylodex" of Grace Co.) | 3 g |
| | Aluminium grit (0.35–1.2 mm) | 573 g |
| | Curing agent based on an adduct of trimethyl-hexamethylenediamine and a liquid epoxide resin based on bisphenol-A | 56 g |
| | 3-Aminomethyl-3,5,5-trimethyl-cyclohexylamine | 37 g |
| | Total | 1,000 g |
| 2. | Epoxide resin as in Example 1 | 293 g |
| | Phthalocyanine blue | 0.5 g |
| | Titanium dioxide | 19.5 g |
| | Thixotropic agent based on asbestos | 4.0 g |
| | Aluminium grit (0.35–1.2 mm) | 560 g |
| | Liquid polyaminoamide resin (viscosity 869 cP, amine content 13.62%, mol/kg 9.5) | 103 g |
| | Paraffin oil | 20 g |
| | Total | 1,000 g |
| 3. | Epoxide resin based on an addition product of pentaerythritol glycidyl ether and bisphenol-A (viscosity at 25° C: 1,300–1,800 cP, epoxide equivalent weight: 148–158) | 273.5 g |
| | Titanium dioxide | 22.0 g |
| | Hydrated chrome oxide green | 5.5 g |
| | Thixotropic agent based on asbestos | 3.0 g |
| | Aluminium grit (0.35–1.2 mm) | 571.0 g |
| | Paraffin oil | 16.0 g |
| | Curing agent based on an adduct of trimethyl-hexamethylenediamine and a liquid epoxide resin based on bisphenol-A | 22.0 g |
| | Bis-(3-methyl-4-amino-cyclohexyl)-methane | 87.0 g |
| | Total | 1,000.0 g |
| 4. | Epoxide resin based on the glycidyl ether of 4,4'-dihydroxydiphenylmethane (viscosity 12,000–16,000 cP, epoxide equivalent weight 185–210) | 225.0 g |
| | Pentaerythritol glycidyl ether | 25.0 g |
| | Titanium dioxide | 21.0 g |
| | Yellow iron oxide | 9.0 g |
| | Thixotropic agent based on asbestos | 4.0 g |
| | Aluminium grit (0.35–1.2 mm) | 571.0 g |
| | Benzine (boiling range 100–125° C) | 20.0 g |
| | Curing agent based on a trimethylhexamethylene-diamine adduct and a liquid epoxide resin based on bisphenol-A | 26.0 g |
| | 3-Aminomethyl-3,5,5-trimethylcyclohexylamine | 73.0 g |
| | Benzyl alcohol | 26.0 g |
| | Total | 1,000.0 g |
| 5. | Branched polyalcohol with ether and ester groups, having a viscosity of 5,000 cP at 20° C, hydroxyl content approx. 5%, acid number <2 and water content 0.2% | 167.0 g |
| | Ether-alcohol (viscosity 34 cP at 20° C, hydroxyl | |

-continued

| | |
|---|---|
| content approx. 11%, water content <0.1%) | 11.0 g |
| 50% strength colour paste of the above resin and titanium dioxide/chrome oxide green 1:1 parts by weight | 116.0 g |
| Molecular sieve paste (for example Zeolite L-paste) | 61.0 g |
| Thixotropic agent based on asbestos | 7.0 g |
| Aluminium grit (0.35–1.2 mm) | 536.0 g |
| Curing agent based on 4,4'-diphenylmethanediisocyanate, viscosity 130–155 cP at 25°C, isocyanate group content approx. 30%) | 102.0 g |
| Total | 1,000.0 g |

6. Unsaturated, liquid polyester resin with styrene as the reactant (viscosity approx. 5,300 cP at 25° C)                               352.0 g
   1% strength cobalt octoate                                                                                                           2.5 g
   50% strength colour paste of the above resin and titanium dioxide/chrome oxide green, 2:3                                          61.0 g
   Thixotropic agent based on asbestos                                                                                                 3.0 g
   Aluminium grit (0.35–1.2 mm)                                                                                                      555.0 g
   Paraffin oil                                                                                                                       19.0 g
   Catalyst consisting of a 50% strength solution of methyl ethyl ketone peroxide in the plasticiser                                    7.5 g Total                                                                                                                          1,000.0 g Properties of the floor coverings manufactured with the mixtures from Examples 1–6

| | | 1 | 2 | 3 | 4 | 5 | 6 |
|---|---|---|---|---|---|---|---|
| Colour shade of the covering | | green | blue | light green | yellow | light green | light green |
| Degree of filling resin/curing agent: filler | | 1:1.52 | 1:1.47 | 1:1.57 | 1:1.6 | 1:1.7 | 1:1.4 |
| Working time at 20° C/1 kg | | approx. 1¼ hrs. | approx. 2 hrs. | approx. 2¾ hrs. | approx. 1¼ hrs. | approx. ¾ hr. | approx. ¾ hr. |
| Leakage resistance in ohm according to DIN 51,953 | | <10³ | <10³ | <10³ | <10³ | <10³ | <10³ |
| Compressive strength (DIN 53,454) in kp/cm² | after 1 week | 672 | 556 | 576 | 432 | The cured covering is too elastic and too soft for measuring the mechanical strengths | 637 |
| | after 4 weeks | 699 | 595 | 725 | 585 | | 760 |
| Flexural strength (VSM 77,103) in kp/cm² | after 1 week | 305 | 510 | 497 | 322 | | 461 |
| | after 4 weeks | 290 | 192 | 498 | 295 | | 501 |
| Impact strength (VSM 77,105) in kp.cm/cm² | after 1 week | 1.22 | 3.46 | 5.13 | 3.77 | | 2.72 |
| | after 4 weeks | 1.29 | 2.82 | 4.68 | 3.53 | | 2.82 |
| Modulus of elasticity (DIN 53,457) in kp/mm² | after 1 week | 376 | 352 | 397 | 284 | | 404 |
| | after 4 weeks | 404 | 376 | 423 | 306 | | 369 |
| Special properties | | resistant to water, dilute inorganic acids and bases and benzine | as in Example 1 | high resistance to aggressive organic solvents, high compressive strength, good stability of colour shade | easy processability, sound-attractive levelling, good stability of colour shade | very elastic, rubbery, pressive absorbing | high compressive strength |

EXAMPLE 7

The following components are mixed with one another: Epoxide resin based on the glycidyl ether of

| | |
|---|---|
| 4,4'-dihydroxydiphenylmethane (viscosity 8,000–12,000 cP at 25° C, epoxide equivalent weight 187–196) | 238.0 g |
| Hexanetriol triglycidyl ether (viscosity 115 cP at 25° C, epoxide equivalent weight 140–150) | 21.5 g |
| 1,4-Butanediol diglycidyl ether (viscosity 14–22 cP | |

-continued

|  |  |
|---|---|
| at 25° C, epoxide equivalent weight 125-143) | 1.5 g |
| Titanium dioxide | 8.0 g |
| Chrome oxide green | 4.5 g |
| Thixotropic agent based on montmorillonite (for example "Bentone 27" of National Lead Co.) | 11.0 g |
| Aluminium grit (0.35-1.2 mm) | 550.0 g |
| Curing agent based on an adduct of trimethylhexamethylenediamine and a liquid epoxide resin based on bisphenol-A | 32.0 g |
| 3-Aminomethyl-3,5,5-trimethylcyclohexylamine | 56.0 g |
| Benzyl alcohol | 62.0 g |
| Paraffin oil | 15.5 g |
| Total | 1,000.0 g |

A floor covering is produced with this mixture.

| | |
|---|---|
| Colour shade of the covering | green |
| Degree of filling, resin/curing agent:filler | 1:1.35 |
| Working time at 20° C/1 kg | about 1 hour |
| Leakage resistance in ohm according to DIN 51,953 | $10^3$ |

What we claim is:
1. A process for the manufacture of antistatic floor coverings or coatings, which comprises
   a. mixing together, based on the total mixture, 30 to 45 percent by weight of a cold-curing liquid synthetic resin combination, 45 to 70 percent by weight of aluminum grit the particles of which have a length of 0.35 to 1.2 mm; 0 to 30 percent by weight of a pigment; and 0.3 to 1.1 percent by weight of a thixotropic agent,
   b. applying said mixture to a base, and
   c. allowing to cure.
2. A process according to claim 1 wherein the synthetic resin combination is an epoxide resin and a curing agent for the epoxide resin.
3. A process according to claim 2 wherein the epoxide resin is based on aromatic compounds.
4. A process according to claim 3 wherein the epoxide resin additionally contains an aliphatic epoxide resin.
5. A process according to claim 2 wherein the synthetic resin combination contains as curing agent a liquid aliphatic or cycloaliphatic polyamine, or a liquid adduct of a polyamine with a polyepoxide, said adduct having at least one primary amino group.
6. A process according to claim 2 wherein the curing agent for the epoxide resin is a liquid polyaminoamide resin.
7. A process according to claim 1 wherein the synthetic resin combination is based on a polyurethane.
8. A process according to claim 7 wherein the synthetic resin combination comprises a polyester or polyether resin having a hydroxyl number of between 1.7 and 12% and a liquid polyisocyanate as the curing agent.
9. A process according to claim 8 wherein the curing agent is a polyisocyanate based on diphenylmethane-4,4'-diisocyanate.
10. A process according to claim 1 wherein the synthetic resin combination comprises an unsaturated polyester resin, an unsaturated monomeric compound which can react therewith and a peroxide catalyst.
11. A process according to claim 1 wherein the synthetic resin combination is based on an acrylic resin, a monomeric compound which can react therewith and a peroxide catalyst.
12. A process according to claim 1 wherein the mixture contains 1 to 5 percent by weight of paraffin oil or benzine.
13. A process according to claim 1 wherein the thixotropic agent is silicon dioxide, montmorillonite or finely divided asbestos as the anti-sedimentation agent.
14. A process according to claim 1 wherein the mixture contains 50 to 60 percent by weight of aluminum grit.

* * * * *